T. J. CLEMENT.
COFFEE POT.
APPLICATION FILED JUNE 13, 1908.
929,388.
Patented July 27, 1909.
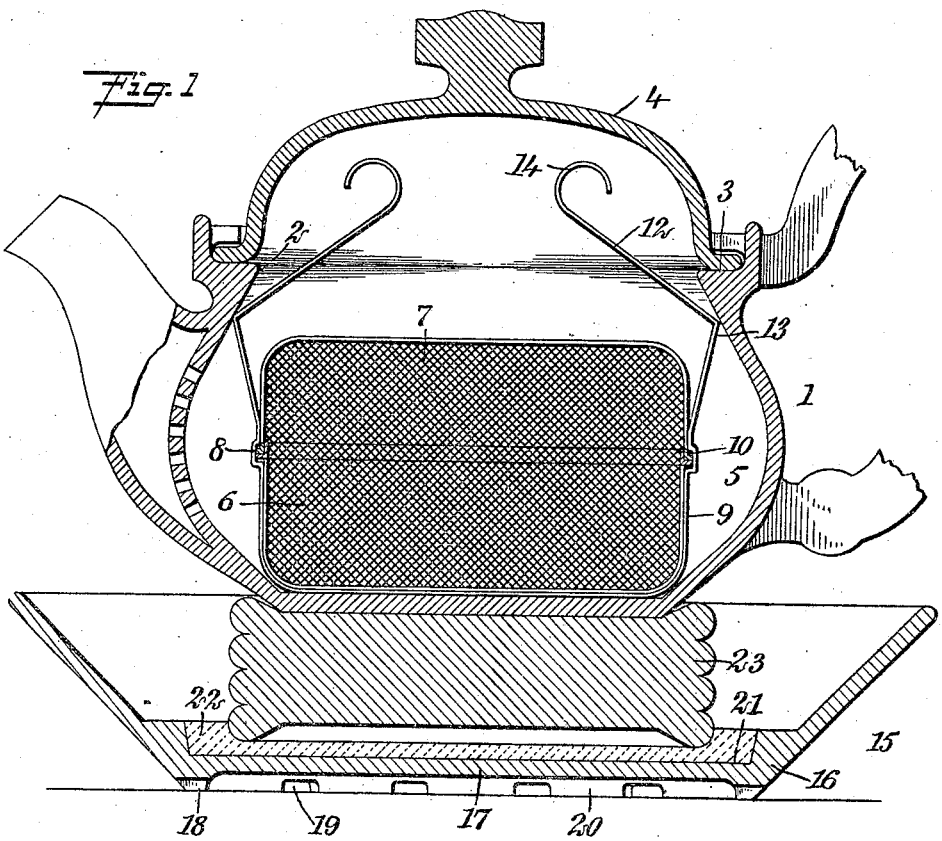
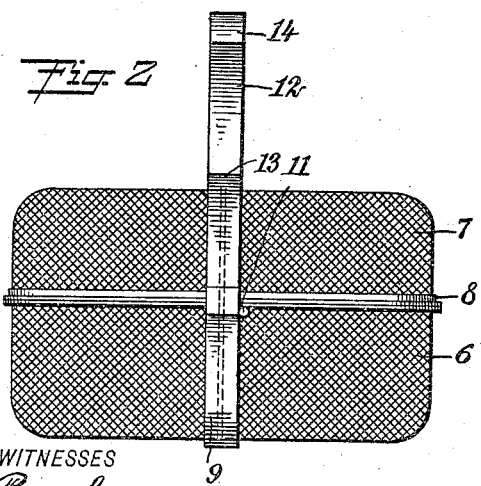
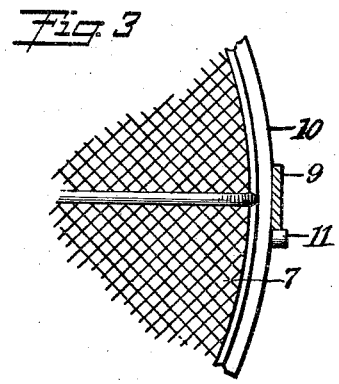
WITNESSES
INVENTOR
Thomas J. Clement
BY
ATTORNEYS

UNITED STATES PATENT OFFICE.

THOMAS J. CLEMENT, OF ATLANTIC CITY, NEW JERSEY.

COFFEE-POT.

No. 929,388.    Specification of Letters Patent.    Patented July 27, 1909.

Application filed June 13, 1908. Serial No. 438,305.

*To all whom it may concern:*

Be it known that I, THOMAS J. CLEMENT, a citizen of the United States, and a resident of Atlantic City, in the county of Atlantic and State of New Jersey, have invented a new and Improved Coffee-Pot, of which the following is a full, clear, and exact description.

This invention relates to coffee pots.

The object of the invention is to produce a coffee pot having an improved percolator of simple construction which can be readily introduced and removed from the coffee pot. More specifically the construction of the percolator is such that it holds itself fixed within the coffee pot, the member which operates to hold the percolator within the pot operating also to hold the cover of the percolator in position.

The invention consists in the construction and combination of parts to be more fully described hereinafter and particularly set forth in the claims.

Reference is to be had to the accompanying drawings forming a part of this specification in which similar characters of reference indicate corresponding parts in all the figures.

Figure 1 is a vertical section through a coffee pot constructed according to my invention, and through the base therefor, certain parts being broken away and shown in elevation; Fig. 2 is a side elevation of the percolator which is used in the coffee pot; and Fig. 3 is a plan of a portion of the percolator, and illustrating details of its construction.

Referring more particularly to the parts, and especially to Fig. 1, 1 represents a coffee pot which may be of any suitable form such as shown. The upper portion of the coffee pot is slightly contracted so as to form an opening 2 of reduced diameter, and at this point a shoulder 3 is formed, upon which the cover 4 seats. Within the pot I provide a cylindrical percolator 5, the construction of which is shown in Figs. 1 to 3. This percolator is formed of silver wire mesh, or similar material, and comprises a lower section 6 and an upper section or cover 7. At the point where these sections meet, projections flanges or lips 8 are formed which come together as shown. These flanges project outwardly from the percolator, as indicated. The cover section 7 is held in position by means of a keeper 9 which is in the form of a band or strap of light resilient metal which passes around under the lower section and is offset outwardly so as to form recesses 10 which receive the flanges or lips 8, as indicated in Fig. 1. It should be understood that after the cover 7 is placed in position, this keeper 9 is slid laterally into position upon the percolator so that the recesses 10 engage the flanges, as shown. In order to hold the keeper in position, I provide the sides of the percolator with outwardly projecting stop pins or stops 11, as indicated in Fig. 3, and in placing the keeper in position it is forced over against these stops. These stops are located so that when the keeper comes against them it will have moved slightly past the diameter of the percolator so that it will not tend to slide rearwardly and become disengaged.

The ends of the keeper are formed into upwardly extending arms 12, the lower portions of which are formed into outwardly projecting elbows 13 which are adapted to engage the contracted mouth of the coffee pot, as shown in Fig. 1. Above this point the arms extend inwardly and are formed with hooks 14 at their upper ends which may be readily grasped by one's fingers. The coffee pot seats upon a base 15 which consists of a saucer 16. This saucer has an elevated bottom 17 and an annular seat 18 which rests upon the surface of a table. This seat 18 is provided with notches 19 so that air may circulate in the air chamber 20 which is formed under the bottom 17, as shown. The saucer 16 has upwardly inclined sides, as shown, and on its upper side the bottom 17 is formed with a shallow cup or basin 21. In this basin a disk 22 of asbestos or similar material, is tightly pressed so that it holds itself in position, as will be readily understood. Upon this disk a block of stone 23 seats. This block is formed of stone or similar material adapted to retain heat, and has considerable mass so that the heat which it retains will be imparted slowly to the coffee pot which seats upon it, as shown.

Having thus described my invention, I claim as new and desire to secure by Letters Patent,—

1. A percolator for a coffee pot, having a body section and a cover section with projections extending outwardly therefrom, and a keeper extending up the sides of said percolator lying flat against the sides thereof and having recesses receiving said projections and locking said sections together, said keeper inclining away from said percolator above said projections and having upwardly extending resilient arms adapted to engage the wall of the coffee pot to fix the percolator therein.

2. A percolator for a coffee pot, having a body section and a cover section seating thereupon, said sections having meeting flanges, and a keeper consisting of a band passing under said body section and up the sides of said percolator, said band having offsets forming recesses receiving said flanges and locking said sections together, said keeper further having upwardly extending arms forming handles for removing said percolator.

3. A percolator presenting a substantially cylindrical side wall, and a keeper consisting of a band passing down the sides of said wall and under said percolator, said keeper having diametrically opposite upwardly extending arms forming handles, the lower part of said keeper lying close against the body of said percolator, said percolator having stops for engaging the edges of said keeper to hold said keeper in position.

In testimony whereof I have signed my name to this specification in the presence of two subscribing witnesses.

THOMAS J. CLEMENT.

Witnesses:
F. D. AMMEN,
JOHN P. DAVIS.